Figure 1:
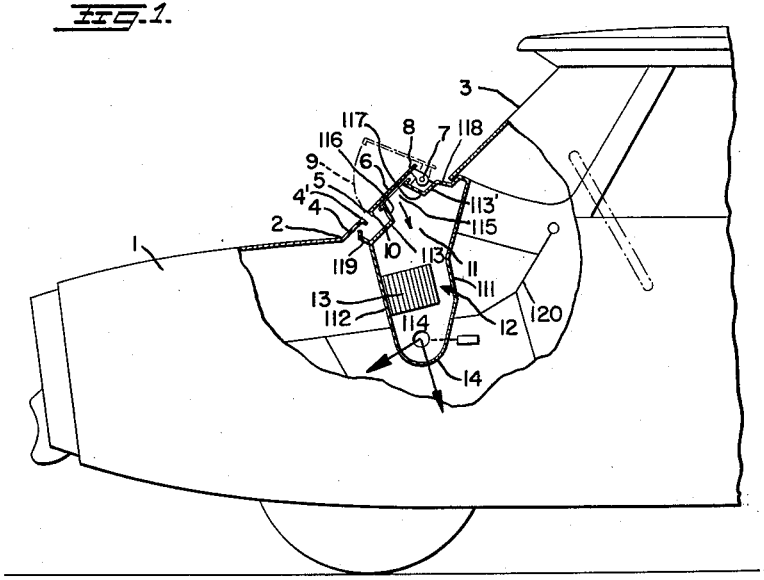

Nov. 14, 1961        B. BARÉNYI        3,008,400

VENTILATING ARRANGEMENT IN MOTOR VEHICLES

Filed Jan. 28, 1958

INVENTOR
BELA BARÉNYI

BY Dicke and Craig

ATTORNEYS

3,008,400
VENTILATING ARRANGEMENT IN MOTOR VEHICLES

Béla Barényi, Stuttgart-Vaihingen, Germany, assignor to Daimler-Benz Aktiengesellschaft, Stuttgart-Unterturkheim, Germany
Filed Jan. 28, 1958, Ser. No. 711,604
Claims priority, application Germany Feb. 13, 1957
2 Claims. (Cl. 98—2)

The present invention relates to a motor vehicle with a hood covering the engine compartment which in direct proximity ahead of the front windowpane or windshield proceeds at a more inclined angle than in the more forward part thereof.

In the motor vehicles of the prior art construction, the openings or apertures for ventilating the passenger space are arranged at the front side of the vehicle or the air is branched off for that purpose from the cooler or radiator ventilating system. In such prior art constructions, it was not possible to provide and conduct into the passenger space fresh air which remained unheated, i.e., which was not heated by the engine. Furthermore, the air supplied and conducted in the known manner was liable to be contaminated with gases given off by the engine or with oil vapors, a feature which was annoying to the passengers of the vehicle and could readily lead to headaches and sickness of the passengers.

With those covering hoods of the prior art which extend in the rear region thereof approximately horizontally and possess thereat an air aperture, as is the case in certain other prior art devices, it is not possible to provide a sufficient quantity of fresh air to the passenger space.

The present invention serves primarily to avoid the aforementioned disadvantages of the prior art constructions.

The present invention essentially consists in that an aperture which preferably may be completely or partially closed is provided in the upwardly bent portion of the integral covering hood or cowl of the vehicle for purposes of ventilation of the passenger space. The ventilating aperture thereby extends over only the center part of the hood which extends essentially over the full width of the vehicle. However, as is well known with changeable conditions, the passenger space need not be supplied constantly with fresh air in the largest possible quantities; for that case, the ventilating aperture is provided with a valve, flap, lid or closure member. The closure member in accordance with the present invention is secured along the upper edge thereof by means of a hinge arranged thereat. As a result of such a construction, a supply of air into the vehicle interior space is made possible which may be regulated and adjusted within wide limits. Since the closure member is secured along the upper edge thereof and may be lifted upwardly about this edge, upon opening thereof the air is effectively trapped and, consequently, more air is supplied to the vehicle interior than would reach the vehicle interior space without this closure member.

A heat exchanger may be arranged in the air duct or channel which follows or adjoins the air aperture which heat exchanger may heat the fresh air independently of the temperature prevailing in the engine compartment, as may be desired in the given case. Furthermore, a filter may be arranged in the air duct or channel and distributing installations may follow the filter for purposes of selectively distributing the fresh air into the various parts of the vehicle.

Accordingly, it is an object of the present invention to provide a ventilating system for motor vehicles which enables the supply of non-heated fresh air to the passenger space in sufficiently large quantities.

Another object of the present invention is the provision of such an arrangement for the fresh-air ventilation to the passenger space of the motor vehicle which permits ready regulation and adjustment thereof over wide limits.

Another object of the present invention is to provide a lid, flap or closure member which upon opening thereof effectively increases the air supply to the interior space of the vehicle by aerodynamically trapping the air, so to speak, during travel of the vehicle.

A further object of the present invention is the provision of a ventilating arrangement which enables heating of the fresh air independently of the temperature which prevails within the engine compartment.

Figure 2:
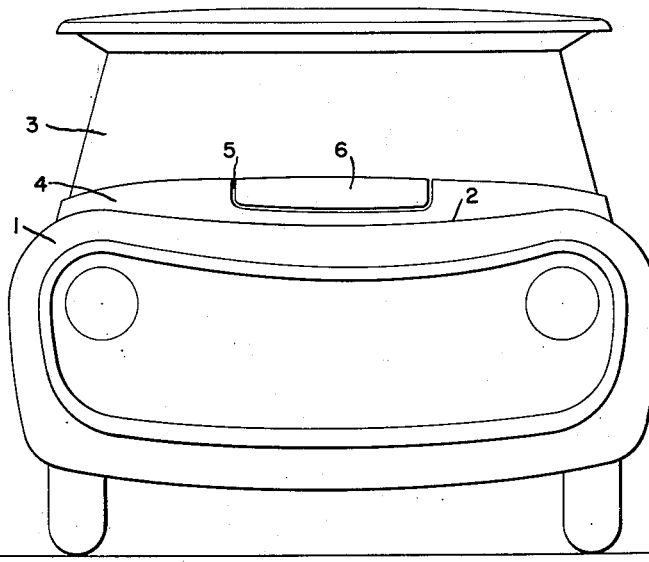

These and other objects, features and advantages of the present invention will become more obvious from the following description when taken in connection with the accompanying drawing which shows, for purposes of illustration only, one embodiment in accordance with the present invention and wherein:

FIGURE 1 is a side view partially broken away of a ventilating and heating arrangement in accordance with the present invention, and FIGURE 2 is a front view of the passenger motor vehicle illustrated in FIGURE 1.

Referring now to the drawing, wherein like reference numerals are used to designate like parts, reference numeral 1 designates therein the hood covering for the engine of the motor vehicle which extends essentially over the entire vehicle width from in front to the rear with a slight incline, FIGURE 1. At the place designated by reference numeral 2, in direct proximity in front of the windshield 3, the hood 1 is provided with a well-defined angular bend and proceeds therefrom at a greater incline than in the forward part thereof. The more inclined part 4 of the cover which also extends essentially over the entire width of the vehicle, as shown in FIGURE 2, is maintained approximately parallel to the windshield 3 at a slight distance therefrom. The aperture 5 for the air supply provided in the inclined part 4 is present only in the center part in the illustrated embodiment. The aperture 5 is provided with a lid or closure member 6. The closure member 6 is pivotally secured along the upper edge 8 thereof by means of a suitable hinge 7. The dash line 9 illustrates the path traversed by the lower edge 10 of the closure member 6 as it is opened upwardly. It is also made clearly recognizable thereby that with the closure member 6 opened, the supply or quantity of air which is conducted through the air aperture 5 is greater than would be the case with only an aperture 5 and without such a closure member 6. The fresh air may enter into the aperture 5 in the direction of the arrow 11. An air duct passes the fresh air into the passenger space. This duct includes a chamber 12 which forms a compartment for a heat exchanger 13. A blower and possibly a filtering installation may also be installed within the heat exchanger compartment formed by the channel 12 either in front of or behind the heat exchanger 13. One or several air distribution installations 14 of any suitable conventional construction such as ducts or lines adjoin these filtering and heat exchanger installations in the direction of flow of the air indicated by arrow 11 admitted through the aperture 5 and flowing through the duct toward the outlets 14 by means of which the air may be selectively supplied adjustably in different directions into the vehicle interior space. The chamber 12 is constituted by a plurality of walls of suitable shape rigidly joined to each other, as shown in FIGURE 1, and is supported below the lid 1 by any conventional means, for example from wall portion 118 or from the transverse support member, only schematically shown. The walls forming the chamber include the transverse rear wall 111, which has several angularly-bent portions so as to conform to the contour of the vehicle and in particular to the desired contour of the passenger space, transverse front wall 112, and upwardly-inclined, forwardly-facing wall portions 113 and 113' which are spaced from wall 4 and extend essentially parallel thereto. Laterally, chamber 12 is delimited by a pair of side walls extending in vertical longitudinal planes of the vehicle, of which only one side wall 114 is shown in FIGURE 1.

A funnel-like inlet duct for chamber 12 is effectively formed by forwardly and upwardly-facing wall portions 116 and 117 together with the side walls 114. The wall portions 116 and 117 extend upwardly and outwardly from opening 115 in the inclined, forwardly-facing wall portions 113 and 113'. As may also be readily seen from FIGURE 1, the lid or cover 6 is adapted to fully close the inlet duct for chamber 12. A transverse upper wall portion 118 is also provided in the chamber assembly to close off the chamber 12 at the top thereof within the region between the inclined part 4 and window 3. The windshield 3 may also be sealed and supported at member 118.

While the lid member 6 fully closes the inlet duct for chamber 12, it only partially closes aperture 5. A gap is formed between the lower edge 10 of the closure member 6 and edge 4' of inclined part 4. In order to prevent any rain water that may enter through this gap from reaching the engine compartment, a channel-shaped wall portion 119 is rigidly secured to the front wall portion 112 in the region of the joint formed by walls 112 and 113. The wall portion 119, together with wall portions 113 and 116, thereby effectively forms a drainage channel for the gap. The entire duct assembly consisting of parts 111, 112, 113, 114, 116, 117, 118, 6, 7 and 119 may be suitably preassembled and thereupon installed in the vehicle in that condition.

In certain cases, it may be advantageous to construct the closure member 6 of such width that it extends in its over-all dimension downwardly up to the angular bend 2 between the forward part 1 and the collar-shaped part 4 of the hood covering the engine compartment.

The hood 1 illustrated herein is formed integrally with the collar-like part 4, and may be provided with any suitable lid or other arrangement (not shown) to enable access to the engine. Moreover, the present invention is also applicable to constructions where the hood and cowl portions are made separately and only joined in any suitable manner during assembly of the vehicle.

While I have shown and described one embodiment in accordance with the present invention, it is understood that the same is not limited thereto but is susceptible of many changes and modifications within the spirit of the present invention, and I intend to cover all such changes and modifications as encompassed by the appended claims.

I claim:
1. A motor vehicle having a windshield and hood means covering the engine compartment, said hood means including a first portion substantially covering said engine compartment and a second portion extending upwardly at an angle from said first portion adjacent said windshield and substantially parallel to said windshield, said second portion having an aperture in the center thereof, duct means for supplying fresh air to the passenger compartment of the vehicle including a chamber and inlet means for said chamber, said inlet means essentially coinciding with said aperture, means for supporting said chamber and said inlet means below said hood means and in communication with said aperture, said chamber comprising front and rear walls extending transversely of the vehicle, longitudinally-extending side walls connecting said front and rear walls and an upwardly-inclined wall spaced from and extending substantially parallel to the second portion of said hood means and secured to said front, rear and side walls to form therewith an enclosed chamber, said inlet means for said chamber including an opening in said upwardly-inclined wall spaced from the edges thereof and an inlet duct extending from said opening to said aperture and formed by wall portions extending upwardly and outwardly from the bottom and top edges of the opening in said upwardly-inclined wall and by said longitudinally-extending side walls, the cross-sectional area of said inlet duct being smaller than the cross-sectional area of said aperture, cover means including a lid member for fully closing said inlet duct and at least partially closing said aperture in the second portion of said hood means, and means for pivotally securing said lid member to the top wall portion to enable pivotal movement thereof for closing said inlet duct, the outer surface of said cover means extending substantially in the same plane as the outer surface of said second portion of the hood means.

2. A motor vehicle according to claim 1, wherein said lid member only partially closes said aperture and provides a gap between the lower edge of said lid member and the lower edge of said aperture, and further including a channel-shaped wall portion secured to said chamber adjacent the juncture of said front wall and said upwardly-inclined wall and extending outwardly therefrom, said channel-shaped wall portion together with said upwardly-inclined wall and the lower one of said upwardly and outwardly-extending wall portions of said inlet thereby forming a trough disposed below said gap in the aperture formed between the lower edge of said lid member and the next adjacent edge of said aperture to thereby provide a drain for said gap.

References Cited in the file of this patent

UNITED STATES PATENTS

| | | |
|---|---|---|
| 1,346,383 | Raab et al. | July 13, 1920 |
| 1,385,255 | Lunt | July 19, 1921 |
| 2,045,578 | Buford | June 30, 1936 |
| 2,262,496 | Hobbs | Nov. 11, 1941 |
| 2,291,543 | Findley | July 28, 1942 |
| 2,295,750 | Norris et al. | Sept. 15, 1942 |
| 2,309,202 | Moore | Jan. 26, 1943 |
| 2,316,619 | Raney | Apr. 13, 1943 |
| 2,355,151 | Findley | Aug. 8, 1944 |